United States Patent [19]

Fukushima et al.

[11] Patent Number: 5,407,987
[45] Date of Patent: Apr. 18, 1995

[54] POLYCYCLIC AROMATIC GROUP - PENDANT POLYSILANES AND CONDUCTIVE POLYMERS DERIVED THEREFROM

[75] Inventors: Motoo Fukushima; Eiichi Tabei; Shigeru Mori, all of Kawasaki, Japan

[73] Assignee: Shin-Etsu Chemical Co., Ltd., Tokyo, Japan

[21] Appl. No.: 202,627

[22] Filed: Feb. 28, 1994

[30] Foreign Application Priority Data

Mar. 1, 1993 [JP] Japan ................................. 5-064752
Sep. 28, 1993 [JP] Japan ................................. 5-264228

[51] Int. Cl.$^6$ .......................................... C08K 5/06
[52] U.S. Cl. .......................... 524/367; 524/401; 524/408; 524/409; 524/434; 252/500; 252/518; 252/519; 628/10; 628/43
[58] Field of Search .............. 528/10, 43; 524/367, 524/401, 408, 409, 434; 252/500, 518, 519

[56] References Cited

U.S. PATENT DOCUMENTS

5,198,520  3/1993  Onishi et al. .................... 528/10
5,278,014  1/1994  Tamaki et al. ................... 430/58

FOREIGN PATENT DOCUMENTS

63-12636   1/1988  Japan .
63-113021  5/1988  Japan .

OTHER PUBLICATIONS

West, "The Polysilane High Polymers", *Journal of Organometallic Chemistry*, vol. 300 (1986), pp. 327–346, Elsevier Sequoia S. A., Lausanne-Printed in The Netherlands.

West et al., "Phenylmethylpolysilanes: Formable Silane Copolymers with Potential Semiconducting Properties", *J. Am. Chem. Soc.*, vol. 103 (1981), pp. 7352–7354.

*Primary Examiner*—Melvyn I. Marquis
*Attorney, Agent, or Firm*—Millen, White, Zelano, & Branigan

[57] ABSTRACT

Polycyclic aromatic group-pendant polysilanes of the following general formula are described.

$$[(R^1R^2Si)_k(R^3R^4Si)_m]_n$$

wherein $R^1$, $R^2$, $R^3$, and $R^4$ are, respectively, a hydrogen atom or a monovalent hydrocarbon group provided that at least one of $R^3$ and $R^4$ is a monovalent hydrocarbon group having a polycyclic aromatic group or a biphenyl group. When the polysilane is doped with an oxidative dopant, the polymer is rendered electrically conductive and has thus wide utility in various fields of photoconductive and electrically conductive materials without involving degradation of the polysilane.

14 Claims, No Drawings

POLYCYCLIC AROMATIC GROUP - PENDANT POLYSILANES AND CONDUCTIVE POLYMERS DERIVED THEREFROM

BACKGROUND OF THE INVENTION

1. Field of the Invention

This invention relates to novel polycyclic aromatic group-pendant polysilanes which have utility as photoconductive and electrically conductive materials and are particularly useful in the fields of electrodes for batteries, solar cells, boxes for electromagnetic shields and the like, and also to conductive polymers obtained by doping such polysilanes.

2. Description of the Prior Art

In recent years, it has been found that doping of polyacetylene with electron acceptors or electron donors results in a charge transfer forming reaction, thereby developing high electric conductivity based on the electron conduction. Attention has now been paid to conductive organic polymer compounds such as polyacetylene, polyphenylene, polypyrrole, polyaniline and polythiophene for use as materials capable of forming highly conductive films.

However, these organic polymer compounds are not molten or fused and are poor in shaping properties. Accordingly, the following problems are involved. Where these polymers are formed into films according to a vapor phase polymerization process or an electrolytic polymerization process, limitation is inevitably placed on the shape of the resultant film, which depends on the shape of a reactor container or an electrode. In addition, when doped with electron acceptors or electron donors, the polymers suffer considerable degradation, thus presenting problems with practical applications.

On the other hand, known polysilanes are predominantly made of those polysilanes which have, as substituents, an alkyl group typical of which is a methyl group, and a phenyl group (R. West et al., J. Am. Chem. Soc. 103, 7352 (1981)).

Also, there have been prepared polysilanes which have hydrogen or reactive carbon-carbon double bonds as a substituent or which have halogenated alkyl groups. This enables one to crosslink the polysilanes, with increasing expectations of their applications (R. West et al., J. Organomet. Chem., 300, 327 (1986)).

Very recently, there have been proposed applications, to resist materials, of polysilanes into which silyl groups are introduced (Japanese Laid-open Patent Application No. 63 -12636 or U.S. Pat. No. 4,727,120) and polysiloxanes introduced with phenolic substituents (Japanese Laid-open Patent Application No. 63-113021 or U.S. Pat. Nos. 4,822,716, 5,017,453 and 5,198,520).

Polysilanes contain silicon atoms, so that they are more metallic in nature and exhibit greater non-electron-localizing properties than those compounds made of carbon atoms. In addition, polysilanes are highly resistant to heat, are flexible and have good thin film-forming properties, thus being very interesting polymers. However, few polysilanes have been known as having high conductivity, with the exception of West el al's polysilastyrenes which are doped with fluorine compounds such as $SbF_5$, $AsF_5$ and the like, thereby obtaining highly conductive polymer materials (R. West et al, J. Am. Chem. Soc., 103, 7352 (1981)). However, there is a demand for conductive polysilanes which exhibit high electric conductivity and which are obtained conveniently from the standpoint of industry.

SUMMARY OF THE INVENTION

It is accordingly an object of the present invention to provide novel polysilanes which are useful as a photoconductive or electrically conductive material.

It is another object of the present invention to provide a conductive polymer which is obtained by doping the novel polysilanes with an oxidative dopant.

According to one embodiment of the present invention, there is provided a polycyclic aromatic group-pendant polysilane of the following general formula (1)

wherein $R^1$, $R^2$, $R^3$, and $R^4$ are, respectively, a hydrogen atom or a monovalent hydrocarbon group provided that at least one of $R^3$ and $R^4$ is a monovalent hydrocarbon group having a polycyclic aromatic group of the following formula (2) or biphenyl group of the following formula (3)

wherein $R^5$ represents a polycyclic aromatic group, p is an integer of $0 \leq p \leq 12$,

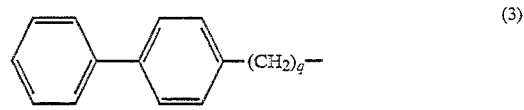

wherein q is zero or an integer of 1 to 6, k, m and n are, respectively, such that $0 \leq k < 1$, $0 < m \leq 1$ provided that $k+m=1$, and $n \leq 6$.

According to another embodiment of the present invention, there is also provided a conductive polymer obtained by doping the polysilane of the formula (1) with an oxidative dopant.

In order to achieve the above objects, we have made intensive studies and, as a result, found that when a diorganohalogenosilane of the following general formula (4) and a polycyclic aromatic group-containing or biphenyl group-containing dihalogenosilane of the following general formula (5) are reacted or only a polycyclic aromatic group-containing or biphenyl group-containing dihalogenosilane of the following general formula (5) is reacted in an inert solvent in the presence of an alkali metal, the novel polycyclic aromatic group-pendant polysilane of the general formula (1) is obtained. The polycyclic aromatic group-pendant polysilanes doped, for example, with iodine have an electric conductivity ranging from $10^{-4}$ to $10^{-5}$ S/cm. This is significantly improved over the electric conductivity of polycyclic aromatic group-free dibutylpolysilane ($3.5 \times 10^{-8}$) or methylphenylpolysilane ($1.3 \times 10^{-6}$ S/cm). Thus, the polysilanes of the invention can be effectively used as a photoconductive or electrically conductive material.

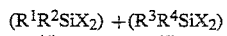

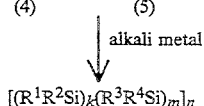

wherein $R^1$, $R^2$, $R^3$ and $R^4$ are, respectively, a hydrogen atom or a monovalent hydrocarbon group provided that at least one of $R^3$ and $R^4$ is a monovalent hydrocarbon group having a polycyclic aromatic group of the following formula (2) or a biphenyl group of the following formula (3)

$$R^5-C_pH_{2p}- \quad (2)$$

wherein $R^5$ represents a polycyclic aromatic group, p is an integer of $0 \leq p \leq 12$,

(3)

wherein q is zero or an integer of 1 to 6, k, m and n are, respectively such that $0 \leq k < 1$, $0 < m < 1$ provided that $k+m=1$, and $n \geq 6$, and X represents a halogen atom.

When the resultant silane polymer is doped with an oxidative dopant such as iodine, ferric chloride, antimony pentafluoride or the like, the electric conductivity increases owing to the existence of the biphenyl group, thereby obtaining a conductive polysilane having high electric conductivity. The polysilanes having biphenyl groups at side chains are soluble in a solvent such as tetrahydrofuran (THF) and may be formed as a film or coating of any desired form. In addition, the polysiloxanes after doping are not embrittled and keep their flexibility. This is advantageous in application as electrodes for batteries, solar cells and boxes for electromagnetic shields.

DETAILED DESCRIPTION OF THE INVENTION

The novel polycyclic aromatic group-pendant polysilanes of the invention are of the following general formula (1)

$$[(R^1R^2Si)_k(R^3R^4Si)_m]_n \quad (1)$$

wherein $R^1$, $R^2$, $R^3$, and $R^4$ are, respectively, a hydrogen atom or a monovalent hydrocarbon group provided that at least one of $R^3$ and $R^4$ is a monovalent hydrocarbon group having a polycyclic aromatic group of the following formula (2) or biphenyl group of the following formula (3)

$$R^5-C_pH_{2p}- \quad (2)$$

wherein $R^5$ represents a polycyclic aromatic group, p is an integer of $0 \leq p \leq 12$,

(3)

wherein q is zero or an integer of 1 to 6, k, m and n are, respectively such that $0 \leq k < 1$, $0 < m \geq 1$ provided that $k+m=1$, and $n \geq 6$, and X represents a halogen atom. Preferably, $0 \leq k < 0.1$ and $0.1 < m \leq 1.0$.

The monovalent hydrocarbon group represented by $R^1$ and $R^2$ has 1 to 12 carbon atoms, preferably 1 to 6 carbon atoms. Specific examples include alkyl groups such as methyl, ethyl, propyl, butyl and the like, cycloalkyl groups such as a cyclohexyl group, and aryl groups such as a phenyl group. $R^3$ and $R^4$ may be a hydrogen atom or such a monovalent hydrocarbon group as defined with respect to $R^1$ and $R^2$ or a group of the afore-indicated formula (2) or (3) provided that at least one of $R^3$ and $R^4$ is of the formula (2) or (3). In the formula (2), the polycyclic aromatic groups represented by $R^5$ include a naphthyl group, an anthracenyl group, a phenanthrenyl group, a triphenylyl group, a pyrenyl group, a chrysenyl group, a naphthacenyl group, a picenyl group, a perylenyl group, a coronenyl group, an ovalenyl group and the like. The polycyclic aromatic group may be unsubstituted or substituted with a monovalent hydrocarbon group having 1 to 10 carbon atoms.

Examples of the polysilanes having biphenyl groups of the formula (3) at side chains include (biphenylethly)-methylpolysilane, biphenylmethylpolysilane, bis(biphenylethyl)polysilane and the like.

In the formula (1), n is an integer of not smaller than 6, preferably 10 to 10,000, and more preferably 100 to 10,000. It is preferred that when the polysilanes are used as a photoconductive or electrically conductive material, a higher degree of polymerization is preferred in order to show the characteristic properties of the polysilane to a satisfactory extent. In general, the weight average molecular weight is in the range of 5,000 to 5,000,000, preferably 10,000 to 2,000,000 on calculation as polystyrene.

As stated hereinbefore, the polysilanes of the formula (1) are prepared by reaction between the diorganohalogenosilane of the following general formula (4) and the polycyclic aromatic group-containing or biphenyl group-containing dihalogenosilane of the following general formula (5) or by sole reaction of the compound of formula (5) in an inert solvent in the presence of an alkali metal.

$$(R^1R^2SiX_2) \quad (4)$$

$$(R^3R^4SiX_2) \quad (5)$$

$R^1$ to $R^4$ have, respectively, the same meanings as defined hereinbefore, and X represents a halogen atom.

The polycyclic aromatic group-containing or biphenyl group-containing dihalogenosilanes may be of either the monopendant type or the dipendant type. The polycyclic aromatic group may be unsubstituted or substituted with a hydrocarbon group. When using dihalosilanes, one-dimensional or linear polymers or cyclic polymers may be produced. Using trifunctional trihalosilanes, network-shaped polysilanes may be obtained, if desired. Moreover, halosilanes having a backbone structure comprising carbon-carbon unsaturated bonds may be used.

The dihalogenosilanes are reacted in an inert solvent in the presence of an alkali metal. Examples of the inert solvent include xylene, toluene, dodecane, ethers, esters which may be used singly or in combination. Examples of the alkali metal include Na and the like. The amount of the alkali metal is preferably in the range of 2 to 2.5 times by mole that of the dihalogenosilane.

The reaction temperature is in the range of 50° to 200° C., preferably 100° to 150° C. The reaction time is generally in the range of 1 to 10 hours.

After completion of the reaction, methanol or the like is added to deactivate the alkali metal, followed by collection of the resultant organic phase and concentration. The resultant polysilane is allowed to settle by use of acetone or the like.

The thus obtained polycyclic aromatic group-pendant polysilanes of the invention exhibit high electric conductivity when doped with oxidative dopants and are suitably usable as a photoconductive or electrically conductive material.

The oxidative dopants used to render the polysilanes electrically conductive include, for example, halogens such as chlorine, bromine, iodine and the like, transition metal chlorides such as tin chloride, ferric chloride and the like, and Lewis acids such as antimony pentafluoride, arsenic pentafluoride and the like. In view of the safety and the ease in handling, iodine and ferric chloride are preferred for doping.

The doping may be effected by several methods including (1) a so-called vapor phase (or dry) doping method wherein the polysilanes are exposed to an atmosphere of a vapor such as of iodine, ferric chloride or the like, (2) a wet doping method wherein the polymer is immersed in a solution dissolving iodine or ferric chloride in an inert solvent, and (3) a method where if the polymer is dissolved in a solution with dissolved iodine or ferric chloride therein, a film or coating is formed from the solution by dry film formation whereupon the polymer is doped simultaneously.

In this connection, the inert solvents used in the wet doping (2) or simultaneous doping (3) are ones which are unable to react with iodine or ferric chloride and to deactivate the ability as an electron acceptor. Examples of the solvent include hydrocarbons such as hexane, octane, cyclohexane and the like, aromatic compounds such as toluene, xylene, nitrobenzene and the like, ethers such as ether, tetrahydrofuran and the like, esters such as ethyl acetate, alcohols such as methanol, ethanol and the like, aprotic polar solvents such as dimethylformamide, dimethylsulfoxide, hexamethylphosphoric triamide and the like, and other solvents such as nitromethane, acetonitrile and the like.

Of these, a solvent, such as tetrahydrofuran, capable of readily dissolving the polysilanes is preferably used for the simultaneous doping. According to the simultaneous doping method, the polysilane is dissolved in a solution containing a dopant and the solution is cast, followed by drying to obtain a doped conductor. In this case, the drying temperature is generally from 0° to 150° C. preferably under normal or reduced pressures.

When using the wet doping or simultaneous doping method, the polymer often degrades with dopants in which gelation or decomposition may take place. In contrast, in the vapor phase doping method (1), no solvent is used and drying is simple, and thus high conductivity is ensured. Thus, the method (1) is very useful.

With the vapor phase doping, the doping speed can be appropriately controlled by controlling the atmospheric temperature and the partial pressure of the dopant. Where iodine or antimony pentafluoride is adopted, it is preferred to dope at a temperature of −30° C. to 200° C. At lower temperatures, the doping speed is slow. On the contrary, when the doping is effected at higher temperatures, degradation of the polymer may take place. The partial pressure of the dopant is preferably in the range of 0.001 mmHg to 5 atmospheric pressures. At lower partial pressures, the doping speed is low. If the partial pressure is increased at a higher level, it is unlikely to expect an increase of the doping speed. With iodine or antimony pentafluoride, the doping readily proceeds at normal temperatures and normal pressures. With ferric chloride which is low in vapor pressure, the doping conditions have to be different from those conditions for iodine or antimony pentafluoride. The doping of ferric chloride is preferably in a temperature range of 50° C. to 300° C. At lower temperatures, the doping speed becomes low, whereas at higher temperatures, the polymer may degrade. The partial pressure of the doping is preferably in the range of 0.001 mmHg to one atmospheric pressure. At lower pressures, it takes a long time before the pressure arrives at a predetermined level, thus being poor in economy. At higher pressures, since ferric chloride has a boiling point of 319° C. at normal pressures, the doping speed becomes very low. More preferably, the doping of ferric chloride should be effected under conditions of a pressure of 0.1 to 10 mmHg and a temperature of 50° to 200° in order to effectively increase the electric conductivity of the resultant polymer. According to the dry doping, there can be obtained a conductive polymer by a very simple procedure using ferric chloride with a reduced degree of toxicity but not using any flammable solvent.

The doped conductive polysilanes of the invention have good shaping properties and are readily formed as highly conductive films or coatings and can be widely applied in electric, electronic and communication fields especially as electrodes for batteries, solar cells, boxes for electromagnetic shields and the like.

The invention is more particularly described by way of examples, which should not be construed as limiting the invention thereto. Comparative examples are also described.

Example 1

Preparation of

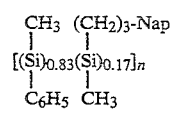

wherein Nap=1-naphthyl group.

15 g of xylene was added to 0.7 g (30 mmols) of metallic sodium in an atmosphere of nitrogen, followed by heating up to 138° C. and violent agitation to obtain a sodium dispersion.

0.56 g (2 mmols) of 3 -(1-naphthyl)propylmethyldichlorosilane and 1.91 g (10 mmols) of methylphenyldichlorosilane were added to the dispersion in 2 minutes, followed by agitation at 138° C. for 4 hours. After completion of the reaction, the reaction mixture was cooled down to room temperature, in which about 5 ml of methanol was dropped so as to deactivate the remaining sodium, followed by washing with water. Thereafter, the resultant organic phase was taken out and dried over calcium chloride, after which the reaction mixture was concentrated. 100 ml of acetone was added to the resultant viscous matter, permitting the polymer to settle. The thus settled polymer was removed by filtration and dried in vacuum to obtain 0.15 g of an intended naphthyl group-pendant polysilane as a white precipitate.

The GPC analysis revealed that the polymer consisted of two components in terms of the weight average molecular weight distribution, with a weight average molecular weight of 516,000 (10%) and a weight average molecular weight of 11,500 (90%) when calculated as polystyrene. A UV absorption (λmax 337 nm) derived from the polysilane was also confirmed.

Example 2

Preparation of

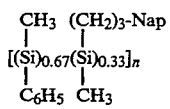

wherein Nap = 1-naphthyl group.

15 g of xylene was added to 0.92 g (40 mmols) of metallic sodium in an atmosphere of nitrogen, followed by heating up to 138° C. and violent agitation to obtain a sodium dispersion.

1.42 g (5 mmols) of 3-(1-naphthyl)-propylmethyldichlorosilane and 1.91 g (10 mmols) of methylphenyldichlorosilane were added to the dispersion in 1 minute, followed by agitation at 138° C. for 5 hours. After completion of the reaction, the reaction mixture was cooled down to room temperature, in which about 5 ml of methanol was dropped so as to deactivate the remaining sodium, followed by washing with water. Thereafter, the resultant organic phase was taken out and dried over calcium chloride, after which the reaction mixture was concentrated. 100 ml of acetone was added to the resultant viscous matter, permitting the polymer to settle. The thus settled polymer was removed by filtration and dried in vacuum to obtain 0.34 g of an intended naphthyl group-pendant polysilane as a white precipitate.

The GPC analysis revealed that the polymer consisted of two components in terms of the weight average molecular weight distribution, with a weight average molecular weight of 243,000 (11%) and a weight average molecular weight of 11,500 (89%) when calculated as polystyrene. A UV absorption ($\lambda$max 336 nm) derived from the polysilane was also confirmed.

Example 3

Preparation of

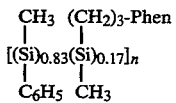

wherein Phen = 1-phenanthrenyl group.

15 g of xylene was added to 0.7 g (30 mmols) of metallic sodium in an atmosphere of nitrogen, followed by heating up to 138° C. and violent agitation to obtain a sodium dispersion.

0.67 g (2 mmols) of 3-(1-phenanthrenyl)propylmethyldichlorosilane and 1.91 g (10 mmols) of methylphenyldichlorosilane were added to the dispersion in 2 minutes, followed by agitation at 138° C. for 4 hours. After completion of the reaction, the reaction mixture was cooled down to room temperature, in which about 5 ml of methanol was dropped so as to deactivate the remaining sodium, followed by washing with water. Thereafter, the resultant organic phase was taken out and dried over calcium chloride, after which the reaction mixture was concentrated. 100 ml of acetone was added to the resultant viscous matter, permitting the polymer to settle. The thus settled polymer was removed by filtration and dried in vacuum to obtain 0.50 g of an intended phenanthrenyl group-pendant polysilane as a white precipitate.

The GPC analysis revealed that the polymer consisted of two components in terms of the weight average molecular weight distribution, with a weight average molecular weight of 376,000 (11%) and a weight average molecular weight of 7,900 (89%) when calculated as polystyrene. A UV absorption ($\lambda$max 336 nm) derived from the polysilane was also confirmed.

Example 4

Preparation of

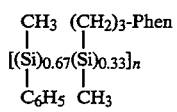

wherein Phen = 1-phenanthrenyl group.

15 g of xylene was added to 0.92 g (40 mmols) of metallic sodium in an atmosphere of nitrogen, followed by heating up to 138° C. and violent agitation to obtain a sodium dispersion.

1.66 g (5 mmols) of 3-(1-phenanthrenyl)propylmethyldichlorosilane and 1.91 g (10 mmols) of methylphenyldichlorosilane were added to the dispersion in 1 minute, followed by agitation at 138° C. for 4 hours. After completion of the reaction, the reaction mixture was cooled down to room temperature, in which about 5 ml of methanol was dropped so as to deactivate the remaining sodium, followed by washing with water. Thereafter, the resultant organic phase was taken out and dried over calcium chloride, after which the reaction mixture was concentrated. 100 ml of acetone was added to the resultant viscous matter, permitting the polymer to settle. The thus settled polymer was removed by filtration and dried in vacuum to obtain 1.40 g of an intended phenanthrenyl group-pendant polysilane as a white precipitate.

The GPC analysis revealed that the polymer consisted of two components in terms of the weight average molecular weight distribution, with a weight average molecular weight of 937,000 (15%) and a weight average molecular weight of 5,250 (85%) when calculated as polystyrene. A UV absorption ($\lambda$max 336 nm) derived from the polysilane was also confirmed.

Example 5

Iodine was doped in each of the polycyclic aromatic group-pendant polysilanes obtained in Examples 2 and 4, followed by measurement of the electric conductivity. The results are shown in Table 1 below. For comparison, the results of $(Bu_2Si)_n$ and $(MePhSi)_n$ are also shown in the Table 1.

TABLE 1

| Polysilane | Electric conductivity (S/cm) |
| --- | --- |
| $[(MePhSi)_{0.67}(Nap\text{-}(CH_2)_3\text{—}SiMe)_{0.33}]_n$ | $7.0 \times 10^{-5}$ |
| $[(MePhSi)_{0.67}(Phen\text{-}(CH_2)_3\text{—}SiMe)_{0.33}]_n$ | $2.5 \times 10^{-4}$ |
| $(Bu_2Si)_n$ [molecular weight 72,000] | $3.5 \times 10^{-8}$ |
| $(MePhSi)_n$ [molecular weight 34,000] | $1.3 \times 10^{-6}$ |

The electric conductivity was measured according to the following procedure. Four terminals were formed on a glass sheet by vacuum deposition of platinum to provide electrodes, on which a polymer solution in a solvent was spin coated to form a thin film on each electrode, thereby providing a sample for measurement of the electric conductivity. The sample was contacted with iodine, ferric chloride or antimony pentachloride under light-shielding and hermetically sealing conditions to follow up a variation of DC resistance in relation to time. The electric conductivity was determined from a stable resistance value at room temperature (25° C.).

Example 6

Preparation of (biphenylethyl)methylpolysilane 0.7 g (30 mmols) of metallic sodium was added to 15 ml of toluene in a stream of nitrogen and heated to 110° C. for dispersion while agitating at high speed. A solution of 3 g (10 mmols) of (biphenylethyl)methyldichlorosilane in 5 ml of toluene was gently dropped in the dispersion under agitation. The agitation was continued over 4 hours until the starting materials disappeared, thereby completing the reaction. Thereafter, the reaction solution was allowed to cool and the resultant salt was filtered and concentrated to obtain 1.6 g (rough yield of 70%) of a polysilane crude product. The polymer was again dissolved in 10 ml of toluene, to which 30 ml of hexane was added to obtain 0.25 g (yield 11%) of (biphenylethyl)methylpolysilane with a weight average molecular weight of 5870 and a number average molecular weight of 3060.

Example 7

The (biphenylethyl)methylpolysilane obtained above was dissolved in THF to obtain a 10% polymer solution. On the other hand, four terminals were formed on a glass sheet by vacuum deposition of platinum to provide electrodes, on which the polymer solution in the THF solvent was spin coated, followed by drying at 2 mmHg/50° C. to form a 1 μm thick thin film. Thus, a sample (1) for measurement of electric conductivity was obtained.

The thin film was attached to the inside of a dried, brown glass bottle container and allowed to stand under sealing conditions along with solid ferric chloride placed on the bottom of the container. The container was connected to a vacuum pump, followed by reduction in pressure to 4 mmHg. In this condition, the ferric chloride on the bottom was heated by means of a mantle heater. By the above procedure, the sample was apparently turned from transparent to blackish brown, simultaneously with a quick increase of the electric conductivity. Finally, the conductivity was kept at a constant level, at which the sample temperature reached 150° C. At this stage, the vacuum pump was stopped and heating was also stopped, followed by allowing to cool down to 25° C. In this stationary state, the conductivity was found to be $1.3 \times 10^{-4}$ S/cm.

Example 8

Using (biphenylethyl)methylpolysilane with a weight average molecular weight of 12,800, a sample (2) for measurement of electric conductivity was obtained in the same manner as in Example 7. The film was doped with ferric chloride under the same conditions as in Example 7. As a result, it was found that the electric conductivity in the stationary state at 25° C. was $7.2 \times 10^{-4}$ S/cm.

Comparative Example 1

Using phenylmethylpolysilane, a sample (3) for measurement of electric conductivity was obtained in the same manner as in Example 7, followed by doping the film with ferric chloride under the same conditions as in Example 7. The electric conductivity in the stationary state at 25° C. was found to be as low as $5 \times 10^{-6}$ S/cm. From this, it was found that the existence of the biphenyl group contributed to improving the electric conductivity.

Example 9

Using (biphenylethyl)methylpolysilane, a sample (1) for measurement of electric conductivity was obtained in the same manner as in Example 7. The film was attached to the inside of a dried, brown glass bottle container, followed by allowing to stand under sealing conditions along with liquid antimony pentafluoride. By this, the film was exposed to the vapor of antimony pentafluoride, resulting in a rapid increase of the conductivity. The appearance was turned black. The conductivity in the stationary state at 25° C. was found to be $1.0 \times 10^{-3}$ S/cm.

Comparative Example 2

The general procedure of Example 9 was repeated using the sample (3) of phenylmethylpolysilane, with the result that the conductivity was $1.3 \times 10^{-6}$ S/cm. From this, it was found that the existence of the biphenyl group contributed to improving the conductivity.

Example 10

Using (biphenylethyl)methylpolysilane, the sample (1) for measurement of electric conductivity was obtained in the same manner as in Example 7. The film was attached to the inside of a dried, brown glass bottle container and allowed to stand under sealing conditions along with solid iodine. The film was exposed to the vapor of the iodine, resulting in an abrupt increase of the conductivity. The appearance was turned from dark blue to blackish brown. The electric conductivity in the stationary state at 25° C. was found to be $2.6 \times 10^{-6}$ S/cm.

What is claimed is:

1. A polycyclic or biphenyl aromatic group-pendant polysilane of the following formula (1)

where in $R^1$ $R^2$, $R^3$ and $R^4$ are independently a hydrogen atom or a monovalent hydrocarbon group provided that at least one of $R^3$ and $R^4$ is a monovalent hydrocarbon group having a polycyclic aromatic group of the following formula (2) or a biphenyl group of the following formula (3)

wherein $R^5$ represents a polycyclic aromatic group, p is an integer of $1 \leq p \leq 12$,

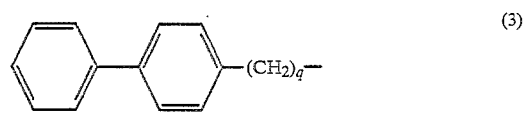

wherein q is an integer of 1 to 6, k, m and n are independently selected such that $0 \leq k <$, $0 < m \leq 1$ provided that $k + m = 1$, and $n \geq 6$.

2. A polycyclic or biphenyl aromatic group-pendant polysilane according to claim 1, wherein $R^1$ and $R^2$ are a monovalent hydrocarbon group having from 1 to 12 carbon atoms.

3. A polycyclic or biphenyl aromatic group-pendant polysilane according to claim 1, wherein $R^5$ in formula (2) is a naphthyl group, an anthracenyl group, a phenanthrenyl group, a triphenylyl group, a pyrenyl group, a chrysenyl group, a naphthacenyl group, a picenyl group, a perylenyl group, a coronenyl group, or an ovalenyl group.

4. A polycyclic biphenyl aromatic group-pendant polysilane according to claim 1, wherein n is an integer of from 100 to 10,000.

5. an Electrically conductive polymer which comprises a doped polycyclic or biphenyl aromatic group-pendant polysilane prepared by doping a polycycli or biphenyl aromatic group pendant polysilane of the following formula (1)

$$[(R^1R^2Si)_k(R^3R^4Si)_m]_n \qquad (1)$$

wherein $R^1 R^2$, $R^3$ and $R^4$ are independently a hydrogen atom or a monovalent hydrocarbon group provided that at least one of $R^3$ and $R^4$ is a monovalent hydrocarbon group having a polycyclic aromatic group of the following formula (2) or a biphenyl group of the following formula (3)

$$R^5-C_pH_{2p}- \qquad (2)$$

wherein $R^5$ represents a polycyclic aromatic group, p is an integer of $1 \leq p \leq 12$,

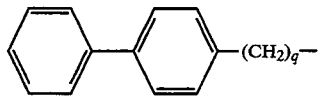

(3)

wherein q is an integer of 1 to 6, k, m and n are independently selected such that $0 \leq k <$, $0 < m \leq 1$ provided that $k+m=1$, and $n \geq 6$, with an oxidative dopant in an amount sufficient to render said polysilane electrically conductive.

6. An electrically conductive polymer according to claim 5, wherein $R^5$ in formula (2) is a naphthyl group, an anthracenyl group, a phenanthrenyl group, a triphenylyl group, a pyrenyl group, a chrysenyl group, a naphthacenyl group, a picenyl group, a perylenyl group, a coronenyl group, or an ovalenyl group.

7. An electrically conductive polymer according to claim 5, wherein said oxidative dopant is iodine.

8. An electrically conductive polymer according to claim 5, wherein said oxidative dopant is ferric chloride.

9. An electrically conductive polymer according to claim 5, wherein said polysilane is doped by exposing said polysilane to the vapor of said oxidative dopant.

10. An electrically conductive polymer according to claim 5, wherein said polysilane is doped by immersing the polysilane in a solution of said oxidative dopant in an inert solvent.

11. An electrically conductive polymer according to claim 5, wherein said polysilane is doped by dissolving said polysilane and said oxidative dopant in a common solvent therefore, and forming a film from the solution by dry film formation.

12. An electrically conductive polymer according to claim 5, wherein the oxidative dopant is chlorine, bromine, iodine, tin chloride, ferric chloride, antimony pentafluoride or arsenic pentafluoride.

13. An electrically conductive polymer according to claim 11, wherein the common solvent is tetrahydrofuran.

14. An electrically conductive polymer according to claim 5, wherein the oxidative dopant is iodine or ferric chloride.

* * * * *